United States Patent [19]

Butsuen et al.

[11] Patent Number: 5,193,844
[45] Date of Patent: Mar. 16, 1993

[54] SUSPENSION SYSTEM FOR A VEHICLE

[75] Inventors: Tetsuro Butsuen; Tohru Yoshioka; Hiroshi Uchida; Yasunori Yamamoto, all of Hiroshima, Japan

[73] Assignee: Mazda Motor Corporation, Japan

[21] Appl. No.: 697,883

[22] Filed: May 9, 1991

[30] Foreign Application Priority Data

May 9, 1990 [JP] Japan .................. 2-120348
May 17, 1990 [JP] Japan .................. 2-128260

[51] Int. Cl.⁵ .................. B60G 11/26; F16F 9/46
[52] U.S. Cl. .................. 280/707; 280/714; 188/299; 188/319; 364/424.05
[58] Field of Search .................. 364/424.05; 188/319, 188/299; 280/707, 703, 714, 709

[56] References Cited

U.S. PATENT DOCUMENTS

| | | | |
|---|---|---|---|
| 4,191,281 | 3/1980 | Nishikawa et al. | 188/319 |
| 4,555,126 | 11/1985 | Ishimitsu et al. | 280/707 |
| 4,696,489 | 9/1987 | Fujishiro et al. | 280/707 |
| 4,714,271 | 12/1987 | Buma et al. | 364/424.05 |
| 4,726,453 | 2/1988 | Obstfelder et al. | 188/299 |
| 4,921,272 | 5/1990 | Ivers | 280/707 |
| 4,970,645 | 11/1990 | Adachi et al. | 280/707 |

FOREIGN PATENT DOCUMENTS

| | | | |
|---|---|---|---|
| 60-248419 | 12/1985 | Japan . | |
| 61-163011 | 7/1986 | Japan . | |
| 0155816 | 6/1990 | Japan | 280/707 |
| 0321966 | 3/1929 | United Kingdom | 188/299 |

Primary Examiner—Margaret A. Focarino
Assistant Examiner—Paul Dickson
Attorney, Agent, or Firm—Thompson, Hine and Flory

[57] ABSTRACT

In a suspension system of a vehicle which the damping force characteristic is changed into three or more characteristics, the damping force characteristic is changed step by step when the damping force characteristic selected by a given control rule is different from the damping force characteristic at that moment in several steps. Also, the running state is detected by detecting means and the damping force characteristic to be selected is limited to two or so from three or more characteristics according to the vehicle running state. The damping force characteristic is changed only within the above selected damping force characteristics based on a given control rule. Through the above, noise and oscillation caused by large changes of the damping force characteristic can be lowered.

16 Claims, 12 Drawing Sheets

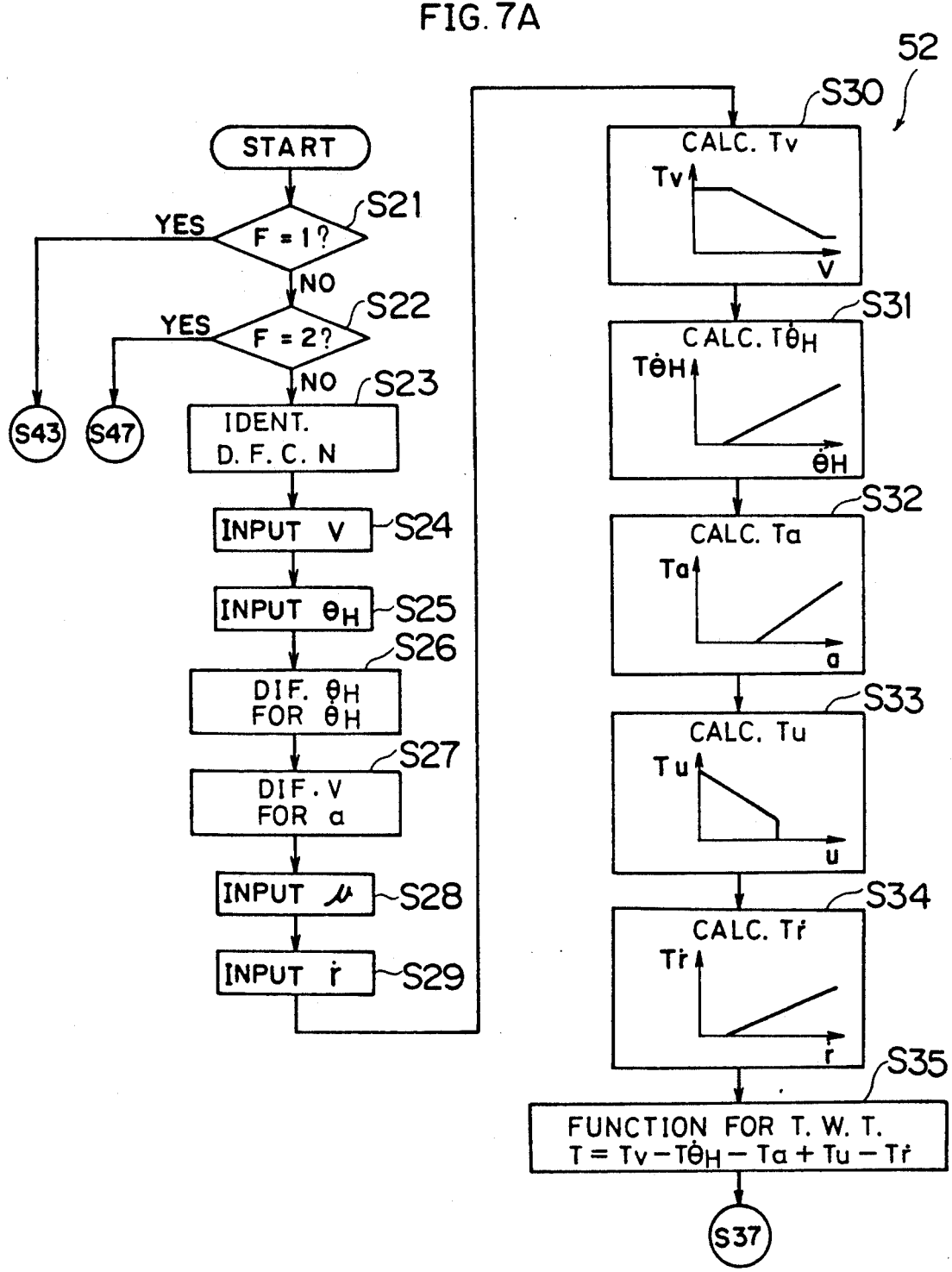

SUSPENSION SYSTEM FOR A VEHICLE

BACKGROUND OF THE INVENTION

This invention relates to a suspension system for a vehicle and more particularly to a suspension system which comprises a shock absorber of damping force characteristic variable type provided between a sprung member and an unsprung member.

In general, the vehicle suspension system comprises a shock absorber, for damping the oscillation of a wheel, interposed between a sprung member and an unsprung member. There are various types of shock absorbers and shock absorbers of damping force characteristic variable type are grouped into one which damping force characteristic (characteristic of different damping coefficient) is changed into two levels (higher level and lower level) and the another which the damping force characteristic is changed into many levels or changed steplessly.

The basic function of the shock absorber of damping force characteristic variable type is that the damping force characteristic of a shock absorber is set lower (i.e., SOFT side) when the damping force generated by a shock absorber acts in the oscillation-stimulating direction (in the same vertical direction as a sprung member) and the damping force is set higher (i.e., HARD side) when the damping force acts in the oscillation-restraining direction (in the opposite vertical direction to the sprung member) so that oscillation-restraining energy is set larger than oscillation-stimulating energy. Thus, comfortableness to ride in and running stability is improved.

Various methods for judging the direction that the damping force of a shock absorber is acting, either in the oscillation-stimulating direction or oscillation-restraining direction with respect to the sprung member, are proposed. For example, the Japanese Patent Application Laying Open Gazette No. 60-248419 discloses a method for judging a direction of a damping force in such a way: the sign of relative displacement between the sprung member and the unsprung member is checked whether it is same as a sign of differentiated value of it, which is relative speed between the sprung member and the unsprung member. If signs are same, it is observed that damping force is acting in the oscillation-stimulating direction and if signs are not same, it is observed that damping force is acting in the oscillation-restraining direction. Also, the Japanese Patent Application Laying Open Gazette No. 61-163011 discloses a method, in which a sign of absolute speed of the sprung member is checked whether it is same as a sign of relative speed between the sprung member and the unsprung member. If signs are same, it is observed that damping force is acting in the oscillation-restraining direction and if signs are not same, it is observed that damping force is acting in the oscillation-stimulating direction.

However, in a vehicle having a shock absorber of damping force characteristic variable in multisteps type, when the damping force characteristic is controlled to generate approximately ideal damping force, a loud noise or oscillation is caused by the large and quick changes of the damping force characteristic of the shock absorber.

SUMMARY OF THE INVENTION

The object of the present invention is to provide a suspension system which lowers the noise and oscillation caused by large and quick changes of the damping force characteristic and possesses effective damping performance.

In order to achieve the above object, the suspension system for a vehicle according to the present invention has hereinafter described construction.

The suspension system for a vehicle comprises a shock absorber, for changing damping force characteristic into three or more characteristics, interposed between the sprung member and the unsprung member, a damping force characteristic selecting means for selecting the damping force characteristic of the shock absorber on the basis of a given control rule, and a damping force characteristic changing means for changing damping force characteristic of said shock absorber step by step to reach the damping force characteristic selected by said damping force characteristic selecting means.

By the above construction, when the damping force characteristic selected by the damping force selecting means largely differs from the damping force characteristic of the shock absorber at that moment, the damping force characteristic is changed step by step by the damping force characteristic changing means. Thus, large and quick changes of the damping force characteristic is prevented and accordingly, noise and oscillation which is caused by the large changes of the damping force characteristic can be lowered.

Also, the another construction of the suspension system according to the present invention comprises a shock absorber for changing damping force characteristic into three or more characteristics interposed between the sprung member and the unsprung member, a running state detecting means for detecting running state of a vehicle, a damping force characteristic limiting means for receiving signals from the above detecting means and limiting the damping force characteristic to be selected from the above three or more characteristics of the shock absorber according to the running state, and a damping force characteristic changing means for changing the damping force characteristic of the shock absorber on the basis of a given control rule within the damping force characteristic limited by the damping force limiting means.

By the above construction, running state (for example, oscillation frequency range of the sprung member, road surface, steering angle, and vehicle speed) is detected by the above running state detecting means and the damping force characteristics to be selected is limited to two characteristics or so according to that running state by the damping force characteristic limiting means from three or more characteristics. Therefore, the damping force characteristic of the shock absorber is changed by the damping force characteristic changing means on the basis of the given control rule only within the limited damping force characteristics. By this way, the noise and oscillation caused by large changes of the damping force characteristic can be lowered and the control is simplified.

The above and further objects and advantages of the present invention will be apparent by reading the following description with reference to the accompanying drawings.

DESCRIPTION OF THE DRAWINGS

Accompanying drawings show preferred embodiments of the present invention, in which:

FIGS. 1-7 show a first embodiment, of which

FIG. 1 is a perspective view showing layout of components of a suspension system, FIG. 2 is a vertical sectional view of a main part of a shock absorber, FIG. 3 is an exploded perspective view illustrating an actuator, FIG. 4 is a diagram illustrating oscillation of a suspension system, FIG. 5 is a block diagram illustrating a control part of a suspension system, FIG. 6 is a flow chart illustrating damping force characteristic selecting control flow, FIG. 7a is the first portion of a flow chart illustrating damping force characteristic changing control flow.

DESCRIPTION OF THE PREFERRED EMBODIMENT

The preferred embodiment is described below with reference to the accompanying drawings.

Figure 1:
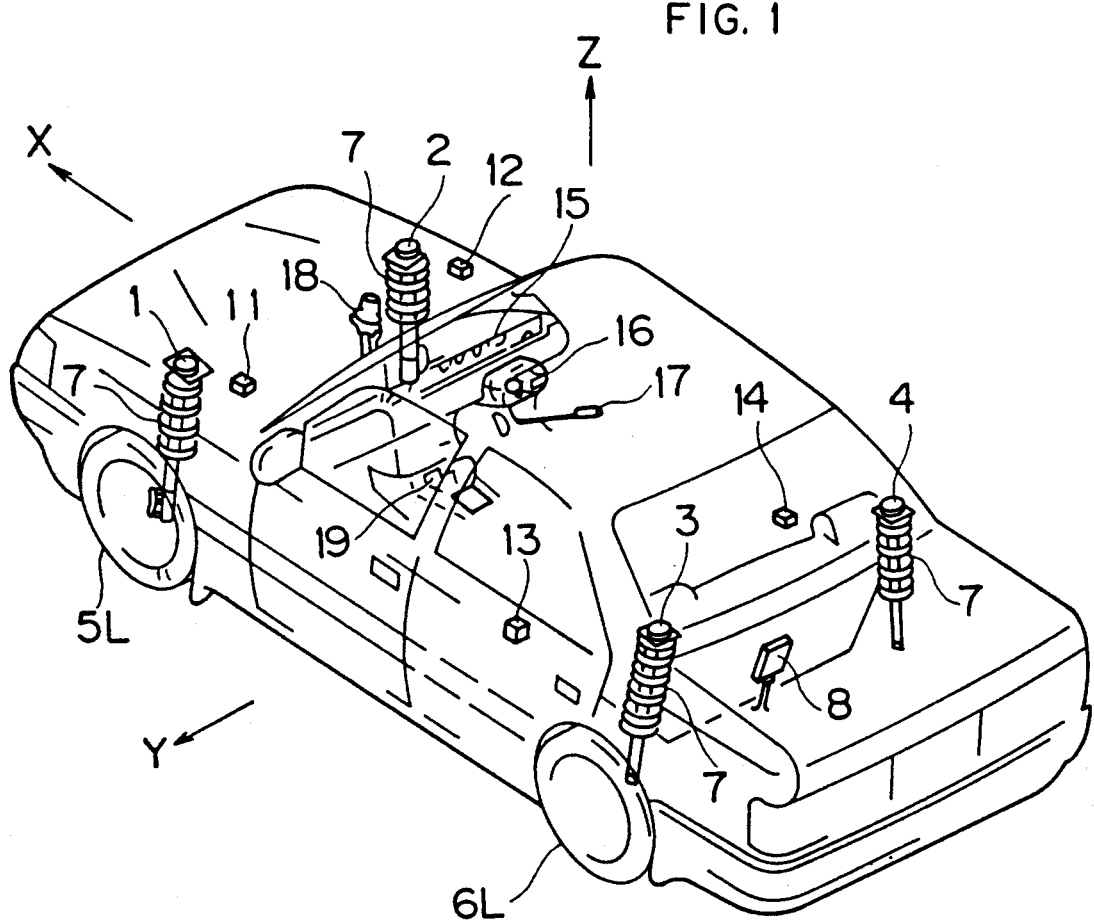

FIG. 1 shows a layout of components of a suspension system. In FIG. 1, reference numerals 1~4 designate four shock absorbers, for damping the oscillation of wheels, provided in right and left front wheels (only left front wheel 5L is shown in the drawings) and right and left rear wheels (only left rear wheel 6L is shown in the drawings). Each shock absorber 1~4 has an actuator 25 (refer to FIGS. 2 and 3) for changing damping force characteristic to three or more characteristics of different damping force coefficients (five characteristics in the present embodiment as shown later) and a vehicle height sensor (not shown in the drawings) for detecting relative displacement between a vehicle body (a sprung member) and an axle (an unsprung member). Reference numeral 7 designates a coil spring provided at an outer circumference of each shock absorber 1~4 at their upper part, and reference numeral 8 designates a control unit for controlling the damping force changeably by receiving a signal from the above vehicle height sensor of each shock absorber 1~4 and outputting a signal to the actuator provided in each shock absorber 1~4.

Reference numerals 11~14 designate four acceleration sensors for detecting acceleration in the vertical direction (Z direction) of the sprung member of a wheel, 15 designates a vehicle speed sensor for detecting a vehicle speed n provided in a meter of an instrument panel, 16 designates a steering angle sensor for detecting a steering angle of the front wheels by the rotation of the steering shaft, 17 designates an accelerator opening sensor for detecting an opening of an accelerator, 18 designates a brake pressure switch for checking whether the brake is under operation (i.e., whether the vehicle is braking) on the basis of the brake fluid pressure, and 19 designates a mode selecting switch by which a driver switches the damping force characteristics of the shock absorbers 1~4 to either HARD, SOFT, or CONTROL. Those sensors 11~17 and switches 18 and 19 output signals to the control unit 8.

Figure 2:
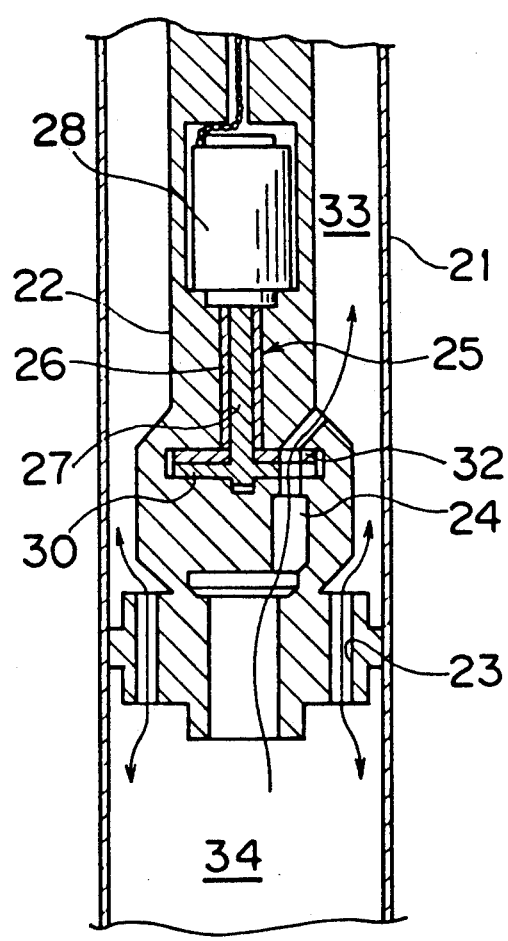

FIG. 2 shows the construction of each shock absorber 1~4, wherein vehicle height sensor of each shock absorber 1~4 is not shown.

In FIG. 2, reference numeral 21 designates a cylinder, a piston unit 22 formed by a piston and a piston rod is inserted slidably therein. The cylinder 21 and the piston unit 22 are mounted to the axle (unsprung member) or a vehicle body (sprung member) through each joint.

Figure 3:
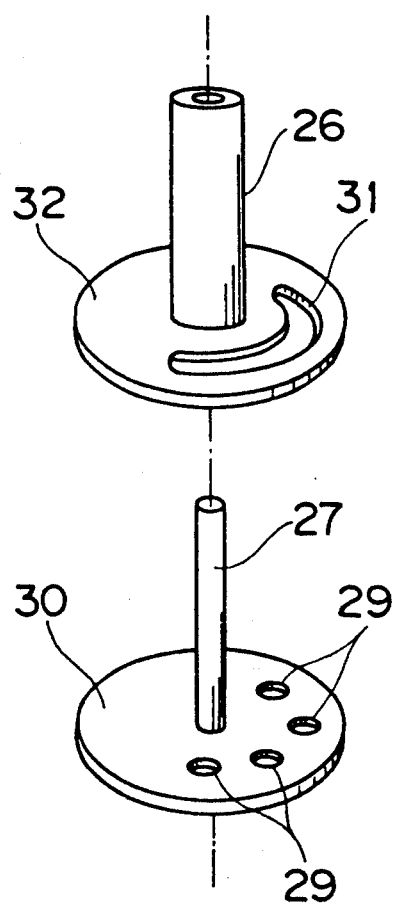

Two orifices 23, 24 are provided in the piston unit 22. The one orifice 23 is open at all times, and a throttling (passage area) of the another orifice 24 is changeable into five levels by an actuator 25. The actuator 25, as shown in FIG. 3, comprises a shaft 27 rotatably provided inside the piston unit 22 through a sleeve 26, a step motor 28 for rotating the shaft 27 at a determined angle, a first orifice plate 30 integrally rotatable with the shaft 27 at its lower end and having four round holes formed at an equal space in between in a circumference direction, a second orifice plate 32 provided inside the orifice 24 and having a long hole 31 of circular arc. The step motor 28 rotates the first orifice plate 30. The round holes 29 of the first orifice plate 30 corresponds to the long hole 31 of the second orifice plate 32 or the number of corresponding round holes 29 varies from zero to four by the rotation of the first orifice plate 30.

An upper chamber 33 and a lower chamber 34 in the cylinder 21 and a hollow part, for connecting to both chambers, provided in the piston unit 22 are filled with fluid having adequate viscosity. This fluid can flow between the upper chamber 33 and the lower chamber 34 through either orifice 23 or 24.

By the above structure, each shock absorber 1~4 possesses five different damping force characteristics of different damping coefficients. If four round holes 29 of the orifice plate 30 don't correspond to the long hole 31 of the orifice plate 32, the orifice 24 is completely closed. Thus, the fluid can flow only through the orifice 23 and the damping force characteristic of each shock absorber 1~4 is set HARD of high damping coefficient. If only one round hole 29 of the orifice plate 30 corresponds to the long hole 31 of the orifice plate 32, the fluid can flow through both orifices 23, 24. However, throttling of the orifice 24 is large. Therefore, the damping force characteristic of each shock absorber 1~4 is set MEDIUM-HARD of rather higher damping coefficient. If two round holes 29 of the orifice plate 30 correspond to the long hole 31 of the orifice plate 32, the damping force characteristic of each shock absorber 1~4 is set NORMAL of medium damping coefficient. If three round holes 29 of the orifice plate 30 correspond to the long hole 31 of the orifice plate 32, the damping force characteristic of each shock absorber 1~4 is set MEDIUM-SOFT of rather lower damping coefficient. If all four round holes 29 of the orifice plate 30 correspond to the long hole 31 of the orifice plate 32, the damping force characteristic of each shock absorber 1~4 is set SOFT of low damping coefficient.

Figure 4:
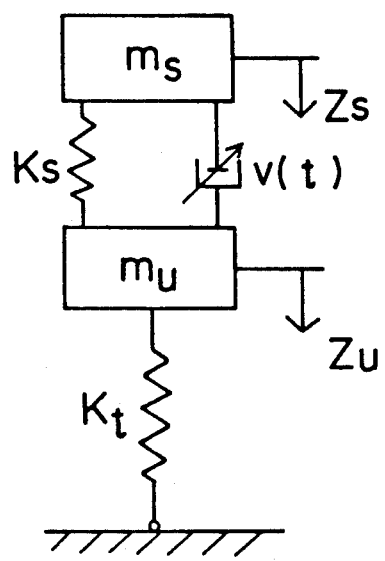

FIG. 4 shows the oscillation model of the suspension system, where ms designates sprung mass, mu designates unsprung mass, zs designates displacement of the sprung member, zu designates displacement of the unsprung member, ks designates a spring constant of a coil spring 7, kt designates a spring constant of a tire, and v(t) designates a damping coefficient of a shock absorber.

Figure 5:
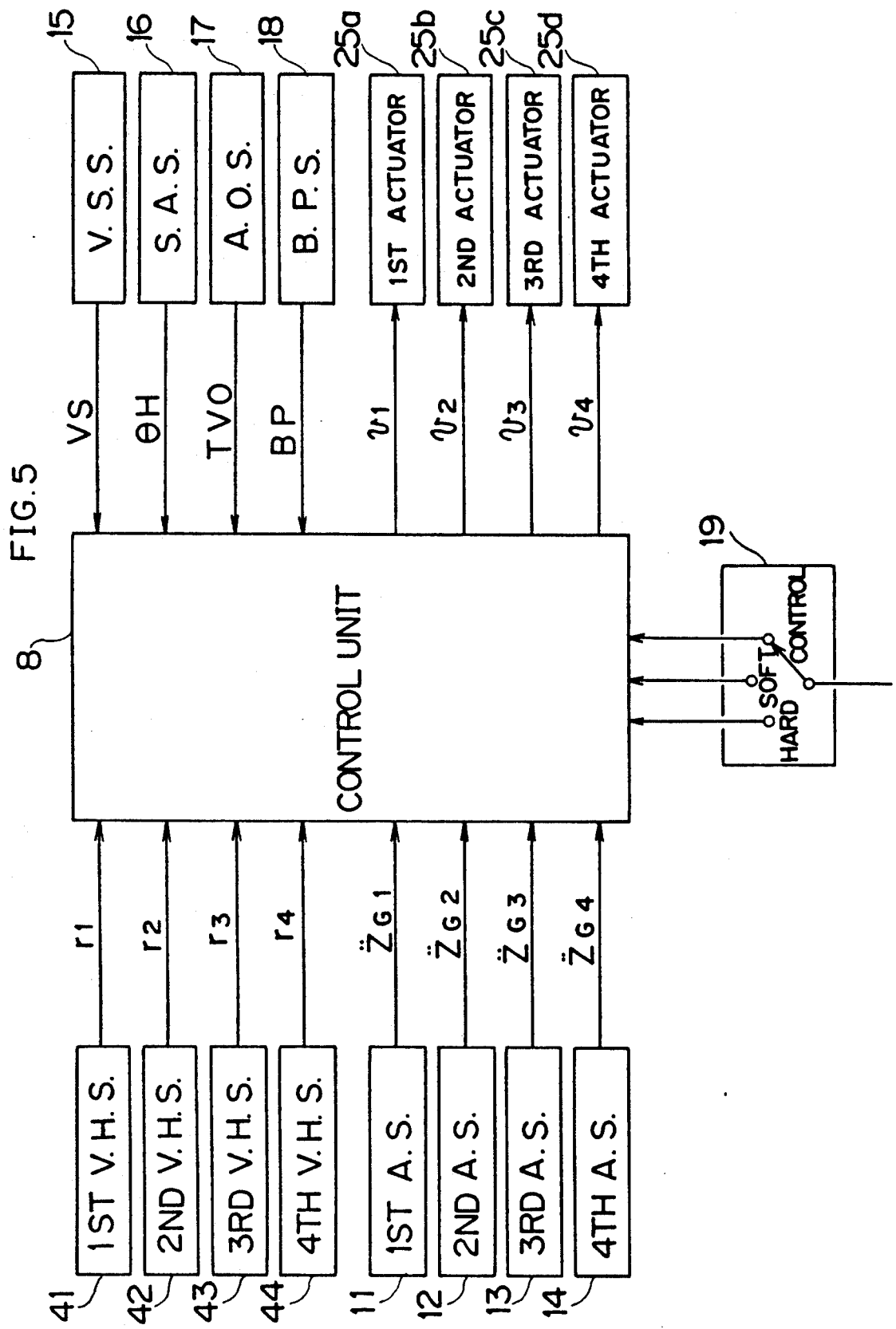

FIG. 5 shows the block diagram of a control part of the suspension system. In FIG. 5, a first set of a vehicle height sensor 41, an acceleration sensor 11, and an actuator 25a corresponds to a front left wheel 5L, so does a second set of a vehicle height sensor 42, an acceleration sensor 12, and an actuator 25b corresponds to a front right wheel, a third set of a vehicle height sensor 43, an acceleration sensor 13, and an actuator 25c corresponds to a rear left wheel 6L, and a forth set of a vehicle height sensor 44, an acceleration sensor 14, and an actuator 25d corresponds to a rear right wheel. The actuators 25a~25d are identical with the actuator 25 of FIG. 2 and the vehicle height sensors 41~44 are provided in each shock absorber 1-4.

Also, in the drawing, r1~r4 designates signals of relative displacement between the sprung member and the unsprung member outputted to the control unit 8 from the first~forth vehicle height sensors 41~44, and those signals take continuous numbers. When each shock absorber 1~4 extends, the signal is positive and when each shock absorber 1~4 is compressed, the signal is negative. The relative displacement is a deviation from the relative displacement where a vehicle is not moving, which is defined 0, (i.e., zs−zu, the difference between zs which is the displacement of the sprung member and zu which is the displacement of the unsprung member as shown in FIG. 4).

Signals $\ddot{Z}_G1$~$\ddot{Z}_G4$, which are signals of sprung-member vertical (Z direction) absolute acceleration, are outputted to the control unit 8 from the first~forth acceleration sensors 11~14, and those signals take continuous numbers. When the sprung member receives the upward acceleration, the signal is positive and when the sprung member receives the downward acceleration, the signal is negative.

Vehicle speed signal VS, steering angle signal $\theta$H, accelerator opening signal TVO are outputted to the control unit 8 from a vehicle speed sensor 15, a steering angle sensor 16, and an accelerator opening sensor 17 respectively. Those signals take continuous numbers. The vehicle speed signal VS is positive when the vehicle moves forwardly and it is negative when the vehicle moves rearwardly. The steering angle signal $\theta$H is positive when a steering wheel turns to counterclockwise from a driver's view (i.e., turning to the left), and it is negative when the steering wheel turns to clockwise (i.e., turning to the right).

Brake pressure signal BP is outputted to the control unit 8 from a brake pressure switch 18, and this signal has alternative, ON or OFF. "On" means that the brake is under operation and "OFF" means that the brake is not under operation.

Actuator control signals v1~v4 are outputted to the actuaters 25a~25d from the control unit 8, and those signals have alternative, UP or DOWN. "UP" signal is for changing the damping force characteristic to one level higher, HARD side. "DOWN" signal is for changing the damping force characteristic to one level lower, SOFT side.

Moreover, mode selecting signal is outputted to the control unit 8 from the mode selecting switch 19, this signal is a parallel signal and takes either HARD, SOFT, or CONTROL in the present invention. "HARD" means that a driver selects HARD mode, so does SOFT means that a driver selects SOFT mode, and CONTROL means that the driver selects CONTROL mode. When HARD mode is selected, the damping force characteristic of all shock absorbers 1~4 is set HARD and when SOFT mode is selected, the damping force of all shock absorbers 1~4 is set SOFT. However, when CONTROL mode is selected, the damping force characteristic of each shock absorber 1~4 is switched to either HARD or SOFT side automatically and independently according to the driving condition and the road surface.

Figure 6:
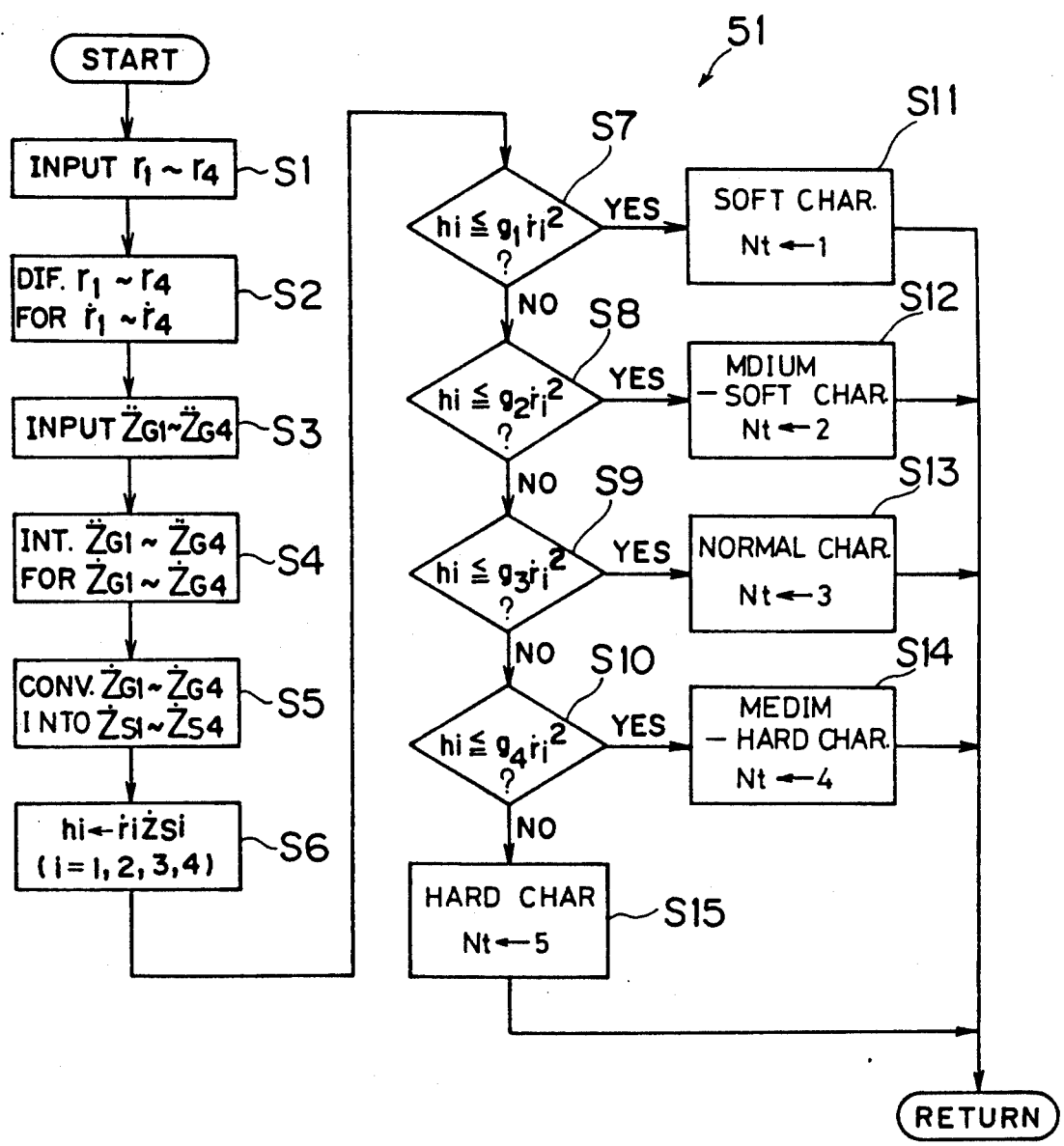
Figure 7B:
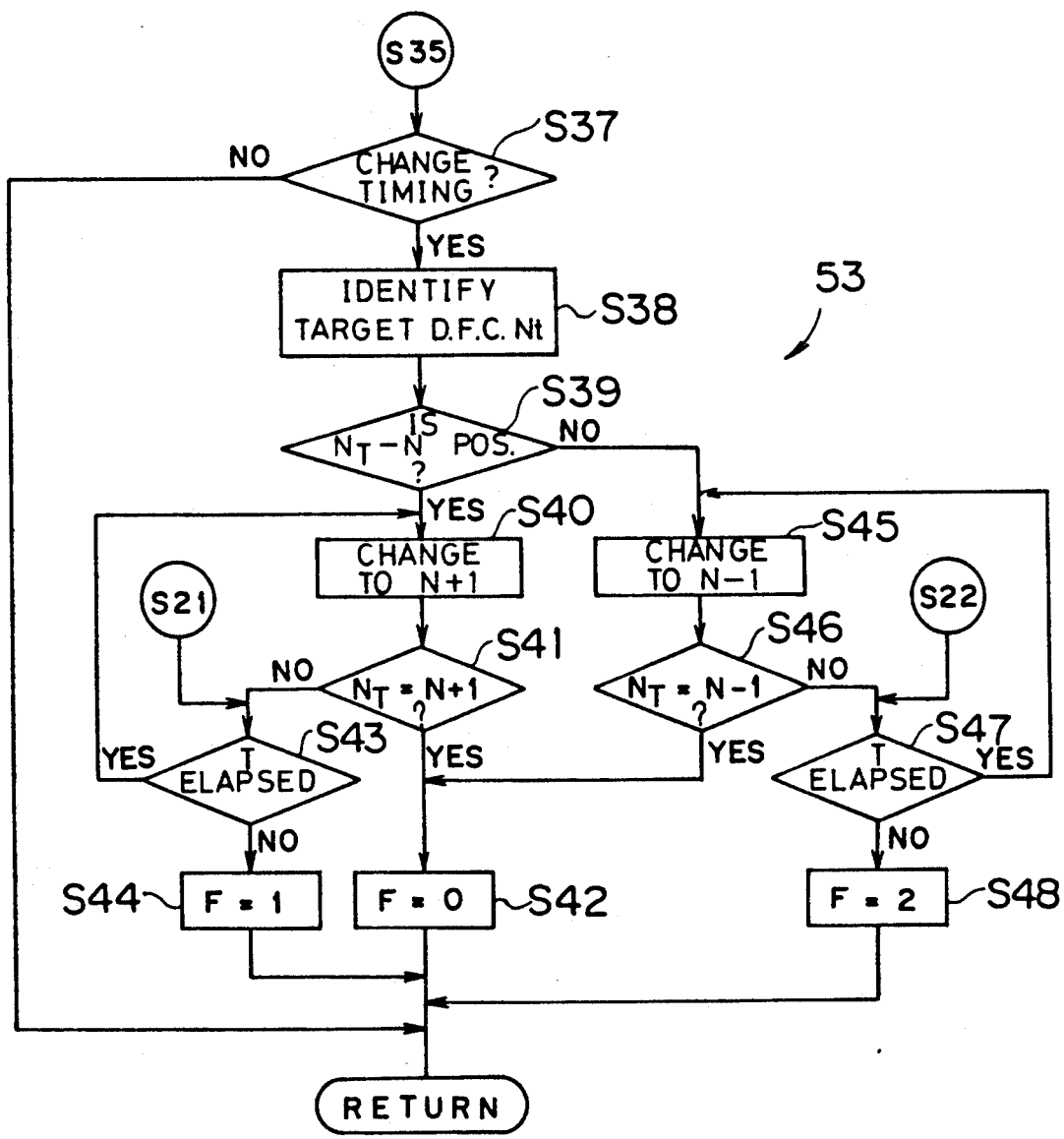
FIG. 7B is the second portion of the flow chart illustrating damping force characteristic changing control flow.

FIGS. 6, 7a and 7b show control flows of the control unit 8 when the CONTROL mode is selected (in more detail, damping force characteristic selecting control flow and damping force characteristic changing control flow). These controls are processed by the control program of the control unit 8 and repeated in a given interval (1~10 ms) by a starting program. The control is described below with the control flow.

In the damping force characteristic selecting control flow of FIG. 6, signals r1~r4 of relative displacement between the sprung member and the unsprung member are inputted at step S1, then these signals r1~r4 are differentiated by differentiation or so at step S2 in order to gain $\dot{r}1$~$\dot{r}4$ which are signals of relative speed between the sprung member and the unsprung member. Next, after signals $\ddot{Z}_G1$~$\ddot{Z}_G4$ which are sprung-member vertical absolute accelerations are inputted at step S3, these $\ddot{Z}_G1$~$\ddot{Z}_G4$ are integrated by integration or so at step S4 in order to gain sprung-member vertical absolute vehicle speed, $\dot{Z}_G1$~$\dot{Z}_G4$. Since these $\dot{Z}_G1$~$\dot{Z}_G4$ are sprung-member vertical absolute speed at the acceleration sensors 11~14, they are converted into zs1~zs4 which are sprung-member vertical absolute speed at the shock absorbers 1~4 at step S5. These $\dot{z}s1$~$\dot{z}s4$ can be gained if three values of $\dot{Z}_G1$~$\dot{Z}_G4$ are found, so $\ddot{Z}_G$ ~$\ddot{Z}_G3$ will be used and $Z_G$ is a substitute. Here, as shown in FIG. 1, suppose a imaginary horizontal xy coordinate is provided. The coordinates for the acceleration sensors 11~13 are expressed by $(X_G1, Y_G)$~$(X_G3, Y_G3)$ and the shock absorbers 1~4 are expressed by (xs1,ys1)~(xs4,ys4), then $\dot{z}s1$~$\dot{z}s4$ are obtained by the following formula: 4

$$\begin{bmatrix} \dot{z}s1 \\ \dot{z}s2 \\ \dot{z}s3 \\ \dot{z}s4 \end{bmatrix} = \begin{bmatrix} 1 & ys1 & -xs1 \\ 1 & ys2 & -xs2 \\ 1 & ys3 & -xs3 \\ 1 & ys4 & -xs4 \end{bmatrix} \begin{bmatrix} 1 & y_G1 & -x_G1 \\ 1 & y_G2 & -x_G2 \\ 1 & y_G3 & -x_G3 \end{bmatrix}^{-1} \begin{bmatrix} \dot{z}_G1 \\ \dot{z}_G2 \\ \dot{z}_G3 \end{bmatrix}$$

where two coefficient matrixes and a product of them are predetermined and given as a constant.

Thereafter, at step S6, a judging function hi is obtained by the following formula:

$$hi = \dot{r}i \cdot \dot{z}si \ (i=1, 2, 3, 4).$$

This judging function hi is a product which is ṙi, the relative speed between the sprung member and the unsprung member, multiplied by żsi, the absolute speed of the sprung member, at each wheel.

After the judging function hi is obtained, the judging function hi is judged to which range it belongs. Those five ranges are classified according to a product $(= g \cdot \dot{r}i^2)$ which is a gain value g1~g4 multiplied by a square of the relative speed between the sprung member and the unsprung member. Each gain value g1~g4 possesses the following relationship:

$$g1 < g2 < g3 < g4.$$

If the judging function hi is equal to or less than a product which is g1 multiplied by $\dot{r}i^2$ (hi≦g1·$\dot{r}i^2$), the damping force characteristic Nt of the target of each shock absorber 1~4 (referred to target damping force characteristic in the below) is set [1] at step S11. If the judging function hi is more than a product of g2·$\dot{r}i^2$ and equal to or less than a product of g2·$\dot{r}i^2$ (g1·$\dot{r}i^2$<hi≦g2·$\dot{r}i^2$), the target damping force characteristic Nt is set [2] at step S12. If the judging function hi is higher than a product of g2·$\dot{r}i^2$ and equal to or less than a product of g3·$\dot{r}i^2$ (g2·$\dot{r}i^2$<hi≦g3·$\dot{r}i^2$), the target damping force characteristic Nt is set [3] at step S13. If the judging function hi is higher than a product of g3·$\dot{r}i^2$ and equal to or less than a product of g4·$\dot{r}i^2$(g3·$\dot{r}i^2$<hi≦g4·$\dot{r}i^2$), the target damping force characteristic Nt is set [4] at step S14. If the judging function hi is higher than a product of g4·$\dot{r}i^2$ (g4·$\dot{r}i^2$<hi), the target damping force characteristic Nt is set [5] at step S15. Here, characteristic Nt=[1] means SOFT characteristic, [2] means MEDIUM-SOFT characteristic, [3] means NORMAL characteristic, [4] means MEDIUM-HARD characteristic, and [5] means HARD characteristic.

The target damping force characteristic Nt is selected between steps S11~S15 and the flow is returned to the start. Through the above flow, damping force characteristic selecting means 51 is formed for setting target damping force characteristic Nt among five damping force characteristics of each shock absorber 1~4 according to hi, which is $\dot{r}i$, the relative speed between the sprung member and the unsprung member, multiplied by $\dot{z}si$, the sprung-member absolute speed.

In the damping force characteristic changing control flow of FIGS. 7a and 7b, a flag F is checked whether it is [1] at step S21, and whether it is [2] at step S22. Here, F=1 means that the control is waiting a timing for changing the damping force characteristic to HARD side and F=2 means the control is waiting a timing for changing the damping force characteristic to SOFT side.

If both judgement at steps S21, S22, are NO (the flag F=0), the damping force characteristic N of each shock absorber 1~4 at that moment (referred to the present damping force characteristic in the below) is identified at step S23. Thereafter the vehicle speed V (vehicle speed signal VS) and steering angle θH (steering angle signal) is inputted at steps S24 and S25 respectively. The steering angle θH is differentiated by differentiation or so at step S26 in order to gain steering angle speed $\dot{\theta}$H. The vehicle speed V is differentiated by differentiation or so at step S27 in order to gain deceleration a.

Friction coefficient μ of the road surface is inputted at the following step S28, and stroke speed of each shock absorber 1~4, i.e., $\dot{r}i$ of the relative speed between the sprung member and the unsprung member is inputted at step S29. Practically, simple methods such as inputting an estimate signal μ from ABS (Anti Skid Brake) or traction of a vehicle and inputting ON/OFF signals of a wiper switch are taken for inputting friction coefficient of road surface.

At step S30~S34, each waiting time TV, TθH, Ta, Tμ, T$\dot{r}$ is obtained at step S35 and total waiting time T is also obtained by the following formula:

$$T = TV - T\dot{\theta}H - Ta + T\mu - T\dot{r} \quad (1)$$

The above each waiting time TV, TθH, Ta, Tμ, T$\dot{r}$ is obtained by the prememorized map. The waiting time TV is a period of time with respect to the vehicle speed V and it is constant in the low vehicle speed region and decreases in medium and high vehicle speed regions while the vehicle speed V increases. The waiting time TθH is a period of time with respect to the steering angle speed $\dot{\theta}$H and it increases with the increase of the steering angle speed $\dot{\theta}$H like a linear function except in an insensible range. The waiting time Ta is a period of time with respect to the vehicle deceleration and it increases with the increase of the vehicle deceleration like a linear function except in an insensible range. The waiting time Tμ is a period of time with respect to the friction coefficient μ of a road surface and it decreases while the friction coefficient of a road surface increases to 0 and it is set 0 at the normal road (μ is almost 1 thereof). The waiting time T$\dot{r}$ is a period of time with respect to the relative speed between the sprung member and the unsprung member and it increases with the increase of the relative speed $\dot{r}i$ like a linear function except in an insensible range.

The above total waiting time T is an interval for changing the damping force characteristic of each shock absorber 1~4 step by step by damping force characteristic changing means 53. An interval setting means 52 for setting the total waiting time T which is an interval for changing characteristic is formed by steps S30~S35. The total waiting time T set by this interval setting means 52 possesses the following features when considering the signs of each term in the above function (1).

1. The total time T is set shorter according as the vehicle speed becomes higher on the basis of TV.
2. The total time T is set shorter according as the steering angle becomes larger on the basis of −TθH.
3. The total time T is set shorter according as the vehicle deceleration speed becomes higher on the basis of −Ta.
4. The total time T is set longer according as the friction coefficient of a road surface becomes smaller on the basis of Tμ.
5. The total time T is set shorter according as the relative speed between the sprung member and the unsprung member (stroke speed of a shock absorber) becomes larger on the basis of −T$\dot{r}$.

The total waiting time T is very short period of time and the maximum of each waiting time is set as below to make the total waiting time positive at all times.

$$TV_{MAX} > (T\dot{\theta}H_{MAX} + Ta_{MAX} + T\dot{r}_{MAX}).$$

After the total waiting time T is obtained at step S35, the timing for changing is waited at step S37, and target damping force characteristic Nt gained by the damping force characteristic selecting control flow as shown in FIG. 6 is identified at step S38. At step S39, it is checked whether the difference between the target damping force characteristic Nt and the present damping force characteristic N is positive, in other words it is judged whether the damping force characteristic is changed to HARD side from the damping force characteristic at that moment.

If the judgement is YES at step S39, the damping force characteristic of each shock absorber 1~4 is set to HARD side by one step (N+1) from the damping force characteristic at that moment (N). This changing is carried out by outputting UP signals v1~v4 to actuators 25a~25d of corresponding shock absorbers from the control unit 8 (refer to FIG. 5). It is judged whether the target damping force characteristic Nt is same as the damping force characteristic after changing (N+1) at step S41. If this judgement is YES, which means they are same, the flag F is set [0] at step S42. Thereafter the flow is returned to the start. If the judgement at step S41 is NO, which means they are not same, the flag F is set [1] at step S44. Thereafter the flow is returned to the start. After the total waiting time T is elapsed between step S43 and step S21, the damping force characteristic is changed to HARD side by one step (N+1) at step S40.

On the other hand, if the judgement is NO at step S39, the damping force characteristic of each shock absorber 1~4 is set to SOFT side by one step (N−1) from the damping force characteristic at that moment (N). This change is carried out by outputting DOWN signals v1~v4 to actuators 25a~25d of corresponding shock absorbers from the control unit 8 (refer to FIG. 4). It is judged whether the target damping force characteristic Nt is the damping force characteristic after changing (N−1) at step S46. If this judgement is YES, which means they are same, the flow goes to step S42. If the judgement at step S46 is NO, which means they are not same, it is judged whether the total waiting time is elapsed at step S47. If this judgement at step S47 is NO, the flag F is set [2] at step S48 and the flow is returned to the start. After the total waiting time T is elapsed between step S47 and step S22, the damping force characteristic is changed to SOFT side by one step (N−1) at step S45.

By the above changing control flow, when the damping force characteristic of each shock absorber 1~4 is changed to the target damping force characteristic selected by the damping force characteristic selecting means 51, a damping force characteristic changing means 53 for changing the damping force characteristic step by step is formed.

In this damping force characteristic changing control, when the target damping force characteristic Nt selected by damping force characteristic N of the shock absorber at that moment for several steps, for example, the present damping foce characteristic N is SOFT characteristic (N=1) and the target damping force characteristic Nt is HARD characteristic (N=5), the damping force characteristic of each shock absorber 1~4 is changed from SOFT characteristic (N=1) to HARD characteristic (N=5) through these steps: MEDIUM-SOFT characteristic (N=2), NORMAL characteristic (N=3), MEDIUM-HARD characteristic (N=4). Therefore the noise and oscillation caused by the large and quick changes of the damping force characteristic can be lowered.

The time required for changing the damping force characteristic step by step is very short and won't be a problem. Therefore, the damping force characteristic of each shock absorber 1~4 can be changed to a proper characteristic among five of them in order to get the ideal damping force and the better damping force performance can be achieved.

Moreover, in the present embodiment, when the damping force characteristic is changed step by step, interval T for changing characteristics (total waiting time) is changed properly according to running state and accordingly, higher damping performance and lower noise and oscillation can be planned. That is, the interval T for changing characteristic is shorter when the vehicle speed V, the steering angle speed $\dot{\theta}H$, and the deceleration a is largely changed. Thus, better response to characteristic changing is obtained and running stability is improved. Also, if the friction coefficient $\mu$ of a road surface is small or the stroke speed of each shock absorber 1~4 (relative speed between the sprung member and the unsprung member), which corelates with road surface, is large, the interval T for changing characteristic is shortened. Thus, better response to the characteristic changing is obtained and the running stability is improved.

Figure 8:
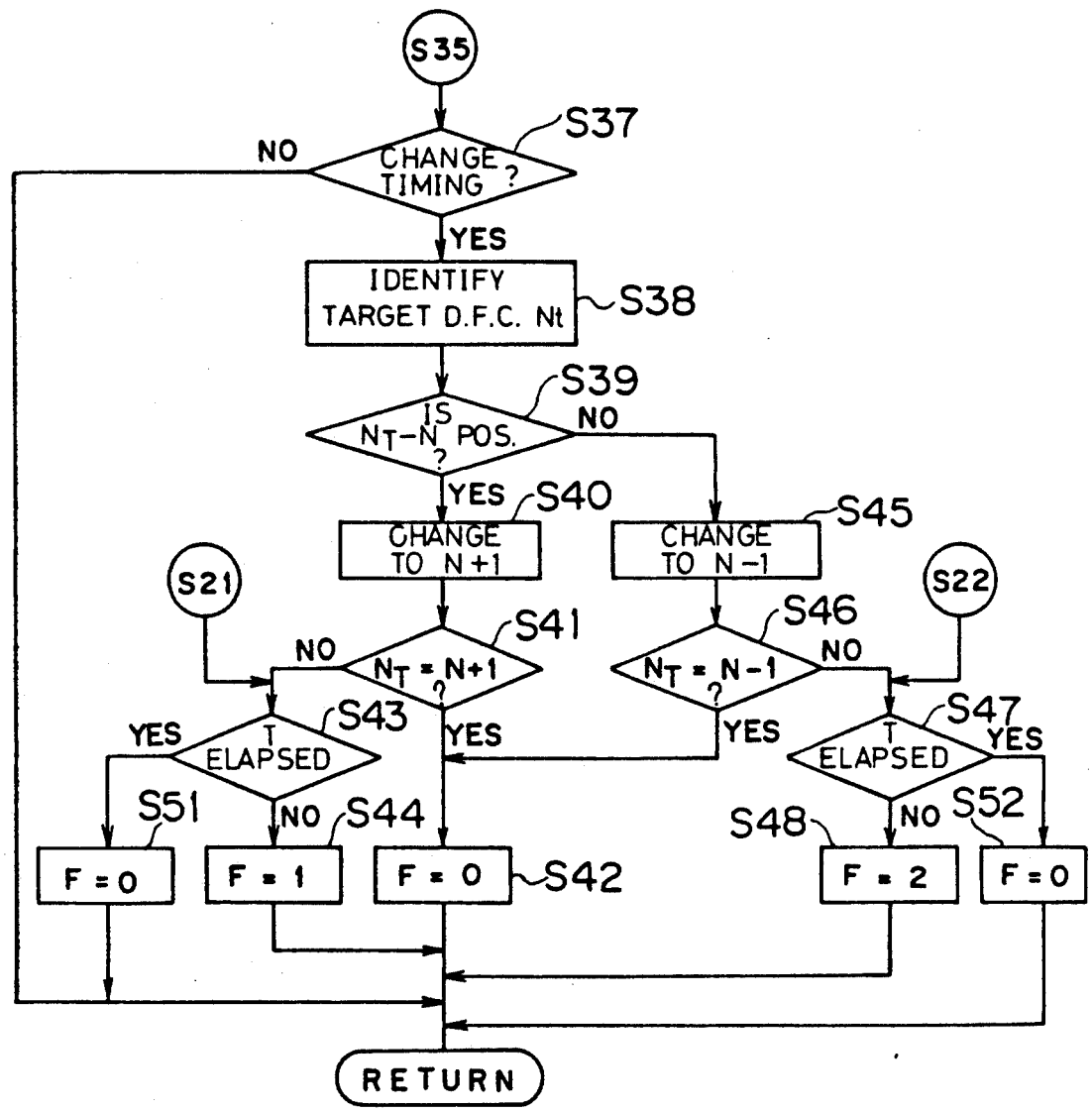
FIG. 8 is a modified flow chart of the changing control flow.

FIG. 8 illustrates modification of a damping force characteristic changing control flow. In this modification, it is checked whether the total waiting time T has elapsed at step S43 or S47. If this judgement is YES, the flag F is set [0] at step S51 or S52 instead of changing damping force characteristic to HARD or SOFT side at step S40 or S45 in the case of the prior embodiment. Thereafter the flow is returned to the start. This control possesses an advantage such as a quick response to the changing of damping force characteristic when the target damping force characteristic is changed during the total waiting time T.

Figure 9:
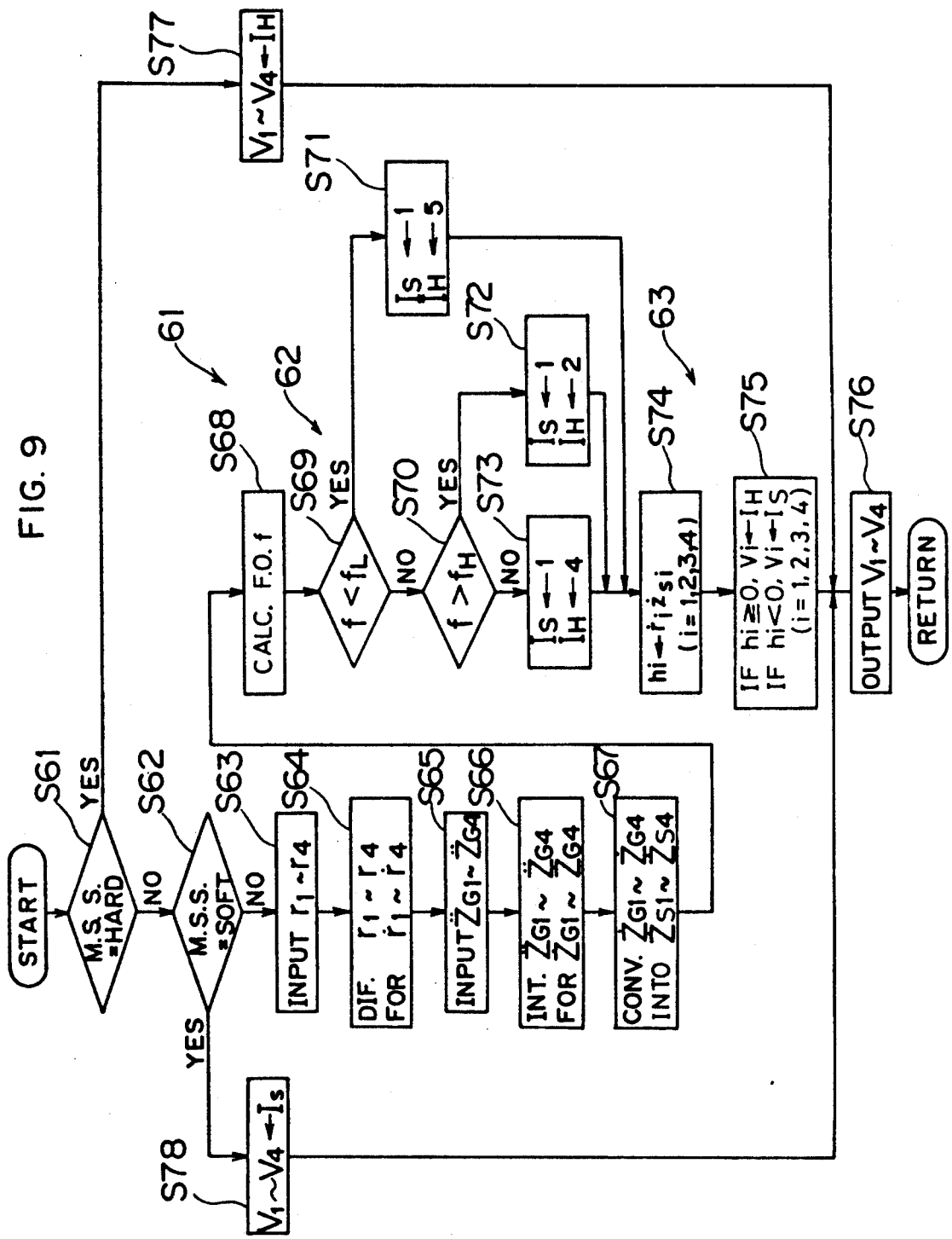
FIG. 9 is a flow chart illustrating control flow of a second embodiment, FIGS. 10 and 11 correspond to FIG. 9 illustrating a third embodiment and a forth embodiment respectively.

FIG. 9 illustrates a control flow of a control unit 8 (refer to FIGS. 1 and 2) of the second embodiment. This control is processed by the control program of the control unit 8. This control program is repeated in a certain interval (1~10 ms) by a starting program provided separately. The control flow is described below with the flow. The hardware of the suspension system is same as the first embodiment and the same numerals are used for the identical parts in order to avoid repetition.

First, it is checked whether the mode selecting signal is HARD at step S61. If this judgement is YES, which means the mode selecting signal is HARD, all actuator control signals v1~v4 are set [$I_H$] at step S77, and those control signals v1~v4 are outputted at step S76. By this way, the damping force characteristics of all shock absorbers 1~4 are set on HARD side as already set. The flow is finished here.

If the mode selecting signal is not HARD, it is checked whether the mode selecting signal is SOFT at the following step S62. If this judgement is YES, which means the mode selecting signal is SOFT, all the actuator control signals v1~v4 are set [$I_S$] at step S78 and control signals v1~v4 are outputted at step S76. By this way, the damping force characteristics of all shock absorbers 1~4 are set on SOFT side as already set. The flow is finished here.

In both judgements at steps S61 and S62 are NO, which means the mode selecting signal is CONTROL, signals r1~r4 of relative displacement between the sprung member and the unsprung member are inputted at step S63 and $\dot{r}1$~$\dot{r}4$ of relative speed between the sprung member and the unsprung member are obtained by differentiating r1~r4 by differentiation or so at step S64.

After sprung-member absolute acceleration signal $\ddot{Z}_G1$~$\ddot{Z}_G4$ are inputted at the following step S65, vehicle vertical absolute speed $\dot{Z}_G1$~$\dot{Z}_G4$ are obtained by integrating $\ddot{Z}_G1$~$\ddot{Z}_G4$ by integration or so at step S66. Since those $\dot{Z}_G1$~$\dot{Z}_G4$ are sprung-member vertical absolute speed at acceleration sensors 11~14, they are converted into sprung-member vertical absolute speed $\dot{z}s1$~$\dot{z}s4$ at shock absorbers 1~4. This conversion is already described in the first embodiment, and won't be described here.

At the following step S68, frequency f of the oscillation of the sprung member is obtained by constantly looking at the sprung-member absolute speed $\dot{z}s$ (or its integration zs, the sprung-member absolute displacement). Thereafter it is checked whether the frequency f is smaller than the predetermined value $f_L$ at step S69. If this judgement is YES, [$I_S$] is set [1] and [$I_H$] is set [5] at step S71. If the judgement at step S69 is NO, it is checked whether the frequency f is larger than the predetermined value $f_H$ ($f_H > f_L$) at step S70. If the judgement at step S70 is YES, [$I_S$] is set [1] and [$L_H$] is set [2] at step S72. If the judgement at step S70 is NO, [$I_H$] is set [1] and [$I_H$] is set [4] at step S73. By the above steps S68~S70 and the acceleration sensors 11~14, running state detecting means 61 for detecting the oscillation frequency of the sprung member in order to check running state is formed. Also, by the steps S69~S73, damping force characteristic limiting means 62 for selecting two damping force characteristics according to the oscillation frequency among five characteristics of the shock absorbers 1~4 is formed.

After selecting two damping force characteristics between steps S71~S73, the judging function hi is obtained by the following formula at step S74:

$$hi = \dot{r}i \cdot \dot{z}si \quad (i = 1, 2, 3, 4).$$

In short, the judging function hi is a product which is ṙi, the relative speed between the sprung member and the unsprung member, multiplied by żsi, the sprung-member absolute speed.

At step S75, if the judging function hi is equal to zero or positive (hi≥0), then vi=$I_H$ and if the judging function hi is negative (hi<0), then vi=$I_S$. At the following step S76, actuator control signals v1~v4 are outputted and the flow is returned to the start. A damping force characteristic changing means 63 for calculating the judging function hi, which is ṙi, the relative speed between the sprung member and the unsprung member, multiplied by żsi, the sprung-member absolute speed, and for changing the damping force characteristic of each shock absorber 1~4 within the two damping force characteristics selected by the damping force characteristic limiting means 62 according to whether or not the judging function hi is zero or more is formed by the steps S74~S76.

According to the above control, if a driver selects CONTROL mode and the judging function hi, which is ṙi (=żsi−zui), the relative speed between the sprung member and the unsprung member, multiplied by żsi, the sprung member absolute speed, is equal to or more than zero (hi≥0) when selecting damping force characteristic within the two damping force characteristic selected among five of them (i.e., the sprung member moves upwardly, the shock absorbers 1~4 are stretched, and the damping force acts on downwardly, or the sprung member moves downwardly, the shock absorbers 1~4 are compressed, and the damping force acts upwardly), the damping force generated by each shock absorber 1~4 is judged that it is acting in the oscillation-restraining direction with respect to the vertical sprung-member oscillation and the damping force characteristic of the shock absorbers 1~4 is changed to HARD side. If the judging function hi is less than zero (hi<0) (i.e., the contradictory conditions of the above) the damping force generated by each shock absorber 1~4 is judged that it is acting in the oscillation-stimulating direction with respect to the sprung-member vertical oscillation and the damping force characteristic of the shock absorber 1~4 is changed to SOFT side. Thus, the control rule of the above control is much simplier than the control rule which changes damping force characteristic among five damping force characteristics and accordingly, less cost and more reliable control or operation can be planned.

Furthermore, the two damping force characteristics to be selected among five damping force characteristics of the shock absorbers 1~4 are not fixed, but changeable according to the sprung-member oscillation frequency which indicates the vehicle running state. In other words, SOFT and HARD characteristics, SOFT and MEDIUM-HARD characteristics, SOFT and MEDIUM-SOFT characteristic are selected in the low oscillation frequency range (f<$f_L$), in the medium oscillation frequency range ($f_L$<f<$f_H$), and in the high oscillation frequency range ($f_H$<f) respectively. Thus, running stability in the low oscillation frequency range and comfortableness to ride in the high oscillation frequency range can be achieved.

As a feature of the present invention, the damping force characteristic of each shock absorber 1~4 in the high oscillation frequency range is selected and changed only within close characteristics of close damping coefficient (SOFT and MEDIUM-SOFT characteristics). Thus, noise and oscillation caused by large and quick changes of damping force characteristic can be lowered, and accordingly the comfortableness to ride in is improved.

Figure 10:
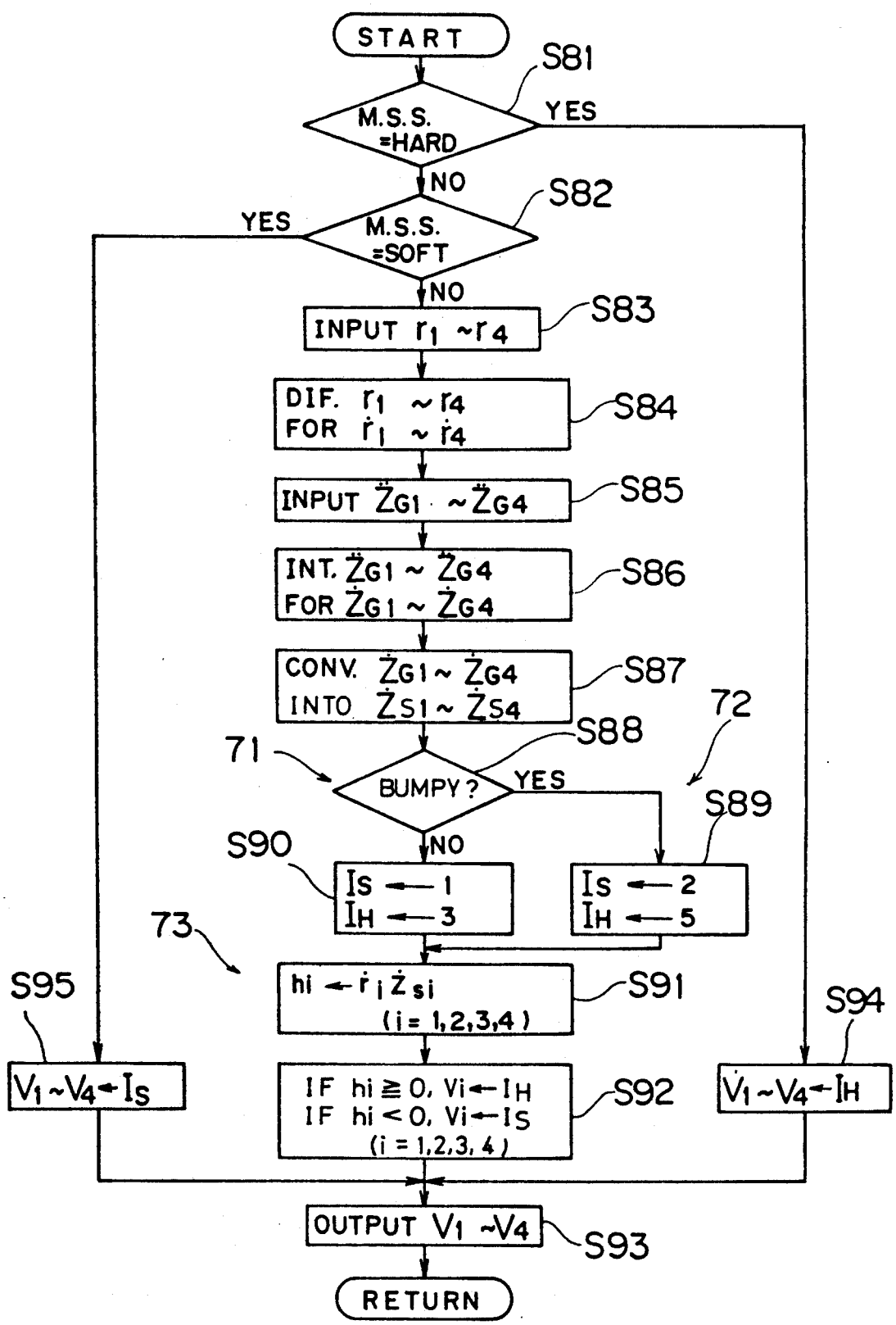
Figure 11:
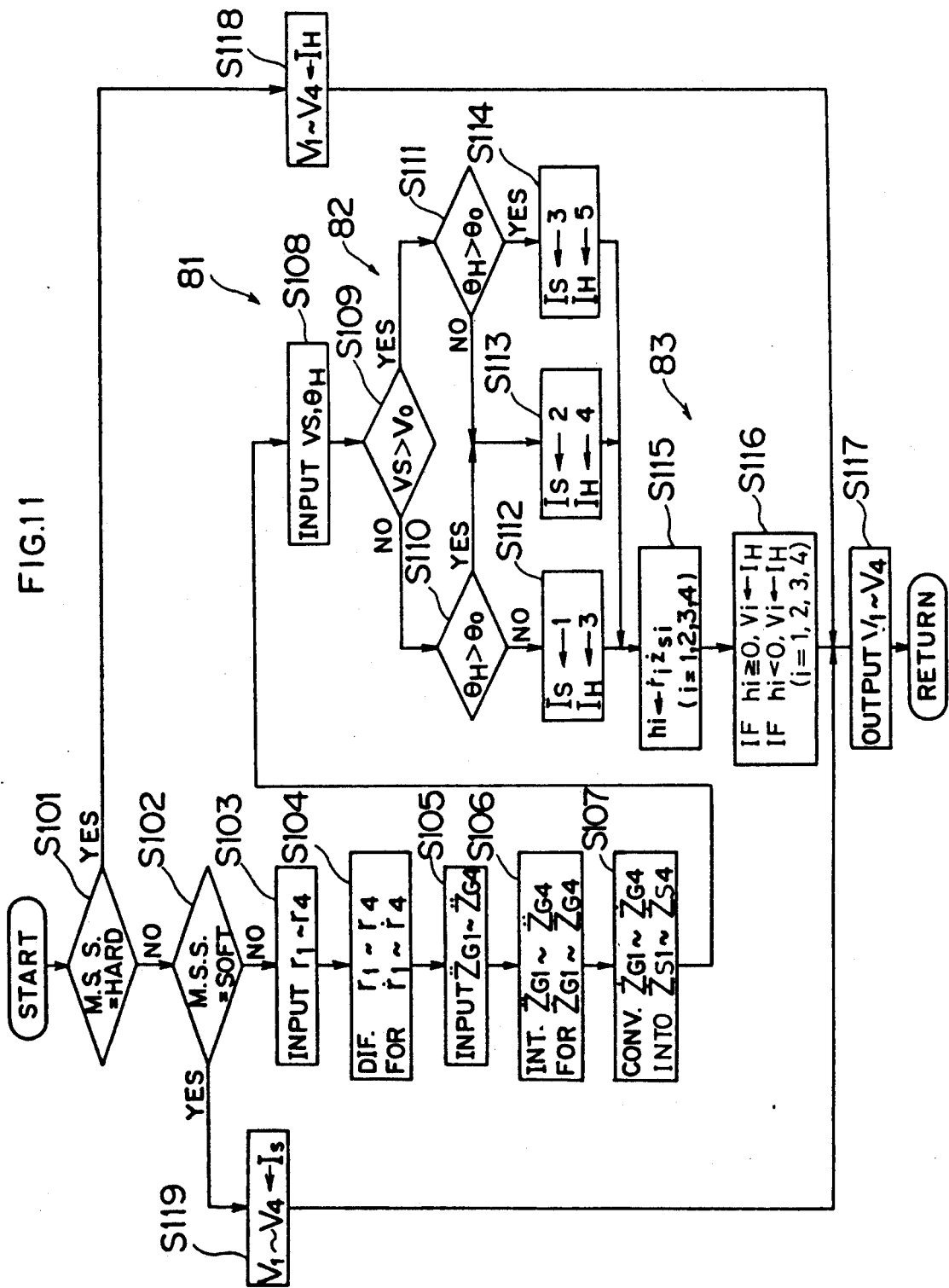

FIGS. 10 and 11 illustrate a modified control flow of the control unit as a third embodiment and a forth embodiment respectively. These control flow differ from the second embodiment in elements for judging to check the vehicle running state and a method for selecting the damping force characteristic of the shock absorber.

In the control flow of FIG. 10, after ṙ1~ṙ4 of the relative speed between the sprung member and the unsprung member and żs1~żs4 of the sprung-member absolute speed are obtained at steps S83~S87, at step S88, it is checked whether the road is bumpy or not by examining the variation of żs1~żs4, the sprung-member absolute speed, or the variation of ṙ1~ṙ4, the relative speed between the sprung member and the unsprung member. If the judgement is YES, which means the road is bumpy, [$I_S$] is set [2] and [$I_H$] is set [5] at step S89. If the judgement is NO, which means the road is not bumpy, [$I_S$] is set [1] and [$I_H$] is set [3] at step S90. A running state detecting means 71 for detecting road surface in order to check the running state is formed by a step S88 and either vehicle height sensors 41~44 or acceleration sensors 11~14. Also, damping force characteristic limiting means 72 for selecting two damping force characteristics among five characteristics of the shock absorbers 1~4 according to road surface is formed by steps S88~S90. The control rule in damping force characteristic changing means 73 for changing damping force characteristic of each shock absorber 1~4 between the two damping force characteristics selected by the damping force characteristic limiting means 72 is as the second embodiment. That is, the judging function hi which is ṙi, the relative speed between the sprung member and the unsprung member, multiplied by żsi, the sprung-member absolute speed, is calculated (at step S91) and damping force characteristic is changed to HARD or SOFT side according to whether or not the judging function hi is more than zero (at step S92).

In this control, if the road is not bumpy, SOFT and NORMAL characteristics are selected among the five damping force characteristics of each shock absorber 1~4. If the road is bumpy, MEDIUM-SOFT and HARD characteristics are selected, which means both two characteristics are set on HARD side and earth connection of the vehicle wheel on the bumpy road is improved effectively by changing the damping force characteristic. Also, since the two selected damping force characteristics are relatively close to each other in damping coefficient, and accordingly the noise and oscillation caused by large change of damping force can be lowered.

In the control flow of FIG. 11, after vehicle speed signal VS and steering signal θH are inputted st step S108, it is checked whether the vehicle speed VS is higher than the predetermined value V0 at step S109 and it is checked whether the steering angle θH is larger than the predetermined angle θ0 at step S110 or S111. If both judgements at steps S109 and S110 are NO, [$I_{SJ}$] is set [1] and [$I_{H\eta}$] is set [3] at step S112. If one of the judgements is NO and the another is YES in each set, the set of steps S109, S110 or the set of steps S109, S110, [$I_{SJ}$] is set [2] and [$I_{H\eta}$] is set [4] at step S113. If both judgements at steps S109, S111 are YES, [$I_{SJ}$] is set [3] and [$I_{H\eta}$] is set [5] at step S114. A running state detecting means 71 for detecting road surface and steering angle in order to check the running state is formed by steps S108, S109, vehicle speed sensor 15, and steering sensor 16. Also, damping force characteristic limiting means 82 for selecting two damping force characteristics among five characteristics of each shock absorber 1~4 according to the vehicle speed and steering angle is formed by steps S109~S114. The control rule in damping force characteristic changing means 83 for changing damping force characteristic of each shock absorber 1~4 between the two damping force characteristics selected by the damping force characteristic limiting means 82 is as the second embodiment. That is, the judging function hi which is ri, the relative speed between the sprung member and the unsprung member, multiplied by zsi, the sprung-member absolute speed, is calculated (at step S115) and damping force characteristic is changed to HARD or SOFT side according to whether or not the judging function hi is zero or more (at step S116).

In this control, if the vehicle speed and the steering angle are less than each predetermined value, SOFT and NORMAL characteristics are selected among the five damping force characteristics of each shock absorber 1~4. If either the vehicle speed or the steering angle is more than each predetermined value, MEDIUM-SOFT and MEDIUM-HARD characteristics are selected. If both the vehicle speed and the steering angle are more than each predetermined value, MEDIUM and HARD characteristics are selected. The above controls show that both two selected characteristics are set on HARD side when the vehicle speed and the steering angle are relatively large. Thus, running stability can be improved effectively by changing the damping force characteristic when driving at high speed or cornering. Also, since the two selected damping force characteristics are relatively close to each other in damping coefficient, and accordingly the noise and oscillation caused by large change of damping force can be lowered.

Through the above second~forth embodiments, the damping force characteristic of each shock absorber 1~4 is limited to two characteristics by the damping force characteristic limiting means 62, 72, 82 and the damping force characteristic is changed on either HARD or SOFT side by the damping force characteristic changing means 63, 73, 83 only within the two selected characteristic according to whether or not the product which is ri, the relative speed between the sprung member and the unsprung member, multiplied by zsi, the sprung-member absolute speed, is more than 0. However, the number of damping force characteristics of the shock absorbers 1~4 limited by the damping force characteristic limiting means 62, 72, 82 is not necessarily limited to two, but damping force characteristics of closer damping coefficient are selected in order to prevent the noise and oscillation caused by large changes of the damping force characteristic. The control rule in damping force characteristic changing means for changing damping force characteristic only within the damping force characteristics selected by the above damping force characteristic limiting means is not limited to the above embodiment, that is the control rule is based on ri, the relative speed between the sprung member and the unsprung member, and żsi, the sprung-member absolute speed. However, other various control rule, for example, control rule based on relative displacement between the sprung member and the unsprung member and relative speed between the sprung member and the unsprung member, can be used.

What is claimed is:

1. A suspension system of a vehicle comprising:
    a shock absorber, for changing damping force characteristic into three or more characteristics, provided between a sprung member and an unsprung member;
    running state detecting means for detecting running state of a vehicle;
    damping force characteristic limiting means for limiting more than three characteristics of said shock absorber to a lesser number which is greater than or equal to two characteristics, and changing the limited characteristics according to the running state of the vehicle; and
    damping force characteristic changing means for changing the damping force characteristic of said shock absorber on the basis of a given control rule within the damping force characteristics limited by said damping force characteristic limiting means. i 2. A suspension system of a vehicle as claimed in claim 1, further comprising:
    sprung-member absolute speed detecting means for detecting the absolute speed of said sprung member;
    relative speed detecting means for detecting relative speed between said sprung member and said unsprung member; and
    a control rule of said damping force characteristic changing means receives signals from both said sprung-member absolute speed detecting means and said relative speed detecting means, calculates a product of sprung-member absolute speed multiplied by the relative speed between said sprung member and said unsprung member, and changes damping force characteristic of said shock absorber to be higher if the product is positive and to be lower if the product is negative.

3. A suspension system of a vehicle as claimed in claim 2, wherein said running state detecting means detects oscillation frequency of said sprung member in order to check running state of the vehicle and said damping force characteristic limiting means limits more than three damping force characteristics, each of said damping force characteristics having a different damping co-efficient, to a lesser number having damping coefficients more similar in a high oscillation frequency region than in a low oscillation frequency region.

4. A suspension system of a vehicle as claimed in claim 2, wherein said running state detecting means detects road surface in order to check running state of the vehicle and said damping force characteristic limiting means changes damping force characteristic to be higher when the road surface is judged to be bumpy.

5. A suspension system of a vehicle as claimed in claim 2, wherein said running state detecting means detects steering angle in order to check running state of the vehicle and said damping force characteristic limiting means changes damping force characteristic to be higher when either the steering angle or the vehicle speed is more than a predetermined value.

6. A suspension system of a vehicle as claimed in claim 2, wherein said sprung-member absolute speed detecting means comprises an acceleration sensor near said shock absorber, integrates sprung-member vertical acceleration detected by said acceleration sensor, and converts the sprung-member absolute speed obtained by that integration into sprung-member absolute speed at said shock absorber.

7. A suspension system of a vehicle as claimed in claim 2, wherein said running state detecting means detects vehicle speed in order to check running state of the vehicle and said damping force characteristic limiting means changes damping force characteristic to be higher when the vehicle speed is more than a predetermined value.

8. A suspension system of a vehicle as claimed in claim 1, further comprising:
 sprung-member absolute speed detecting means for detecting absolute speed of said sprung member;
 relative speed detecting means for detecting relative speed between said sprung member and said unsprung member; and
 a control rule of said damping force characteristic changing means receives signals from said sprung-member absolute speed detecting means and said relative speed detecting means, calculates a product of sprung-member absolute speed multiplied by the relative speed between said sprung member and said unsprung member, and selects the higher damping force characteristic of the larger product.
e
9. A suspension system of a vehicle comprising:
 a shock absorber, for changing damping force characteristic into three or more characteristics, provided between a sprung member and an unsprung member;
 damping force characteristics selecting means for selecting the damping force characteristic of said shock absorber on the basis of a given control rule;
 damping force characteristic changing means for changing the damping force characteristic of said shock absorber step by step to reach the damping force characteristic selected by said damping force characteristic selecting means;
 sprung-member absolute speed detecting means for detecting absolute speed of said sprung member;
 relative speed detecting means for detecting relative speed between said sprung member and said unsprung member; and
 a control rule of said damping force characteristic changing means receives signals from said sprung-member absolute speed detecting means and said relative speed detecting means, calculates a product of sprung-member absolute speed multiplied by the relative speed between said sprung member and said unsprung member, and selects the higher damping force characteristic of the larger product, wherein an interval for changing the damping force characteristic step by step in said damping force characteristic changing means is set shorter while vehicle speed increases.

10. A suspension system of a vehicle as claimed in claim 9, wherein said sprung-member absolute speed detecting means comprises an acceleration sensor near said shock absorber, integrates sprung-member vertical acceleration detected by said acceleration sensor, and converts the sprung-member absolute speed obtained by that integration into sprung-member absolute speed at said shock absorber.

11. A suspension system as claimed in claim 9, wherein said shock absorber comprises:
 a cylinder;
 a piston unit slidably disposed inside of said cylinder;
 a orifice formed in said piston unit; and
 an actuator for changing throttling of said orifice in several levels.

12. A suspension system of a vehicle as claimed in claim 11, wherein said actuator comprises:
 a shaft rotatably provided in said piston unit;
 a step motor for rotating said shaft at a determined angle;
 a first orifice plate integrally rotatably with said shaft at a lower end of said shaft and having a plurality of round holes at an equal space in between in circumference direction; and
 a second orifice plate provided in said orifice formed in said piston unit and having a long hole of circular arc corresponding to said round holes of said first orifice, throttling of said orifice is controlled in several steps by rotating said first orifice plate through said step motor and by changing the number of said round holes corresponding to said long hole of said second orifice.

13. A suspension system of a vehicle comprising:
 a shock absorber, for changing damping force characteristic into three or more characteristics, provided between a sprung member and an unsprung member;
 damping force characteristics selecting means for selecting the damping force characteristic of said shock absorber on the basis of a given control rule;
 damping force characteristic changing means for changing the damping force characteristic of said shock absorber step by step to reach the damping force characteristic selected by said damping force characteristic selecting means;
 sprung-member absolute speed detecting means for detecting absolute speed of said sprung member;
 relative speed detecting means for detecting relative speed between said sprung member and said unsprung member; and
 a control rule of said damping force characteristic changing means receives signals from said sprung-member absolute speed detecting means and said relative speed detecting means, calculates a product of sprung-member absolute speed multiplied by the relative speed between said sprung member and said unsprung member, and selects the higher damping force characteristic of the larger product, wherein an interval for changing the damping force characteristic step by step in said damping force characteristic changing means is set shorter while steering angle speed increases.

14. A suspension system of a vehicle comprising:

a shock absorber, for changing damping force characteristic into three or more characteristics, provided between a sprung member and an unsprung member;

damping force characteristics selecting means for selecting the damping force characteristic of said shock absorber on the basis of a given control rule;

damping force characteristic changing means for changing the damping force characteristic of said shock absorber step by step to reach the damping force characteristic selected by said damping force characteristic selecting means;

sprung-member absolute speed detecting means for detecting absolute speed of said sprung member;

relative speed detecting means for detecting relative speed between said sprung member and said unsprung member; and a control rule of said damping force characteristic changing means receives signals from said sprung-member absolute speed detecting means and said relative speed detecting means, calculates a product of sprung-member absolute speed multiplied by the relative speed between said sprung member and said unsprung member, and selects the higher damping force characteristic of the larger product, wherein an interval for changing the damping force characteristic step by step in said damping force characteristic changing means is set shorter while deceleration of a vehicle increases.

15. A suspension system of a vehicle comprising:

a shock absorber, for changing damping force characteristic into three or more characteristics, provided between a sprung member and an unsprung member;

damping force characteristics selecting means for selecting the damping force characteristic of said shock absorber on the basis of a given control rule;

damping force characteristic changing means for changing the damping force characteristic of said shock absorber step by step to reach the damping force characteristic selected by said damping force characteristic selecting means;

sprung-member absolute speed detecting means for detecting absolute speed of said sprung member;

relative speed detecting means for detecting relative speed between said sprung member and said unsprung member; and a control rule of said damping force characteristic changing means receives signals from said sprung-member absolute speed detecting means and said relative speed detecting means, calculates a product of sprung-member absolute speed multiplied by the relative speed between said sprung member and said unsprung member, and selects the higher damping force characteristic of the larger product, wherein an interval for changing the damping force characteristic step by step in said damping force characteristic changing means is set longer while friction co-efficient of a road surface decreases.

16. A suspension system of a vehicle comprising:

a shock absorber, for changing damping force characteristic into three or more characteristics, provided between a sprung member and an unsprung member;

damping force characteristics selecting means for selecting the damping force characteristic of said shock absorber on the basis of a given control rule;

damping force characteristic changing means for changing the damping force characteristic of said shock absorber step by step to reach the damping force characteristic selected by said damping force characteristic selecting means;

sprung-member absolute speed detecting means for detecting absolute speed of said sprung member;

relative speed detecting means for detecting relative speed between said sprung member and said unsprung member; and a control rule of said damping force characteristic changing means receives signals from said sprung-member absolute speed detecting means and said relative speed detecting means, calculates a product of sprung-member absolute speed multiplied by the relative speed between said sprung member and said unsprung member, and selects the higher damping force characteristic of the larger product, wherein an interval for changing the damping force characteristic step by step in said damping force characteristic changing means is set shorter while stroke speed of said shock absorber increases.

* * * * *

UNITED STATES PATENT AND TRADEMARK OFFICE
CERTIFICATE OF CORRECTION

PATENT NO. : 5,193,844
DATED : March 16, 1993
INVENTOR(S) : T. Butsuen, T. Yoshioka, H. Uchida and Y. Yamamoto It is certified that error appears in the above-indentified patent and that said Letters Patent is hereby corrected as shown below:

Claim 1, Column 14, line 43: delete "i" at end of line.

Claim 8, Column 15, line 47: delete "e".

Claim 16, Column 18, line 47: delete "e".

Signed and Sealed this

Nineteenth Day of April, 1994

Attest:

BRUCE LEHMAN

*Attesting Officer*    *Commissioner of Patents and Trademarks*